Aug. 11, 1936.   H. J. LINGAL   2,050,346
CIRCUIT BREAKER
Filed April 24, 1934   2 Sheets-Sheet 1

WITNESSES:

INVENTOR
Harry J. Lingal
BY
ATTORNEY

Aug. 11, 1936.  H. J. LINGAL  2,050,346
CIRCUIT BREAKER
Filed April 24, 1934   2 Sheets-Sheet 2

WITNESSES:
Fred. C. Witham

INVENTOR
Harry J. Lingal
BY
Ezra W. Savage
ATTORNEY

Patented Aug. 11, 1936

2,050,346

UNITED STATES PATENT OFFICE 2,050,346

CIRCUIT BREAKER

Harry J. Lingal, Wilkinsburg, Pa., assignor to Westinghouse Electric & Manufacturing Company, East Pittsburgh, Pa., a corporation of Pennsylvania Application April 24, 1934, Serial No. 722,052

19 Claims. (Cl. 200—144)

The invention relates generally to circuit breakers and more particularly to circuit breakers for interrupting the flow of current in electrical circuits.

In the operation of circuit breakers provided with plates for receiving and carrying an arc drawn during a switching operation performed to interrupt the flow of electrical current in a circuit, it is frequently required that the electrical condition of the arc be changed before it can be delivered to the plates. When such conditions have to be met, operating difficulties arise which often result in damage to the breaker.

An object of the invention is to provide a breaker in which arcs, drawn during switching operations performed to interrupt the flow of electrical current in a circuit, may be readily transferred from the contact members to the plates, provided for carrying the arcs, without changing appreciably the length of the arcs.

It is also an object of the invention to provide for performing the switching operations, which are required to interrupt the flow of current in a circuit, between the plates provided for carrying the arc to facilitate the transfer of an arc from the contact members to the plates.

Other objects of the invention will in part be obvious and in part appear hereinafter.

The invention accordingly is disclosed in the accompanying drawings and comprises the features of construction, combination of elements and arrangement of parts which will be exemplified in the structure hereinafter set forth and the scope of the application of which will be indicated in the claims.

For a fuller unerstanding of the nature and object of the invention, reference may be had to the following detailed description taken in connection with the accompanying drawings, in which—

Figure 1:
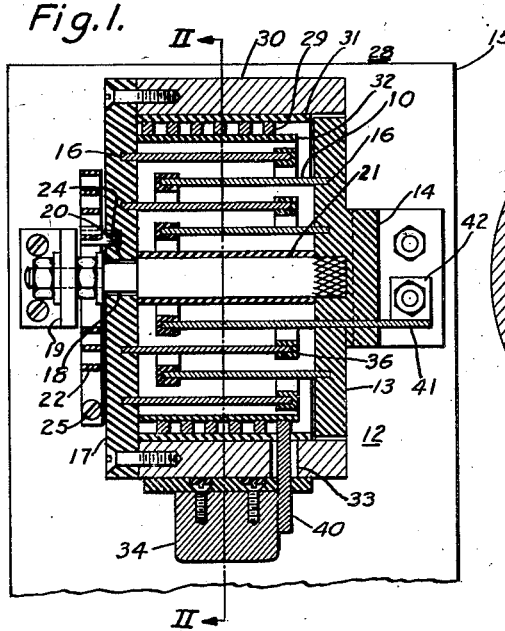
Figure 2:
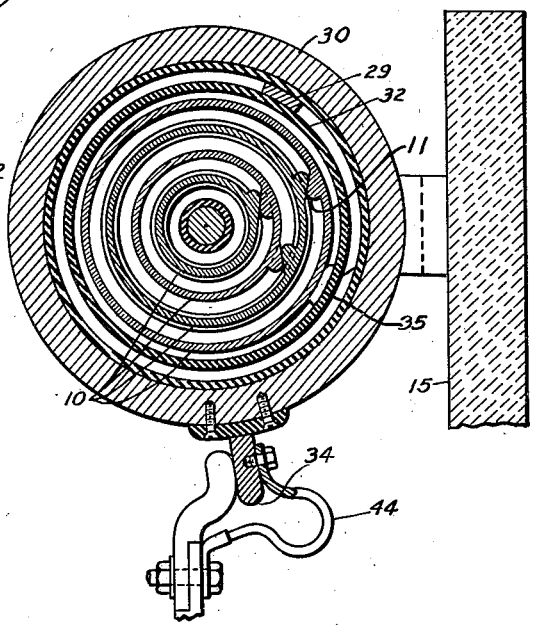
Figure 3:
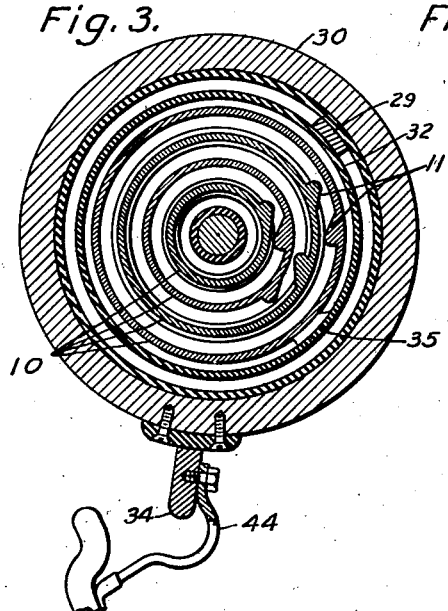
Figure 4:
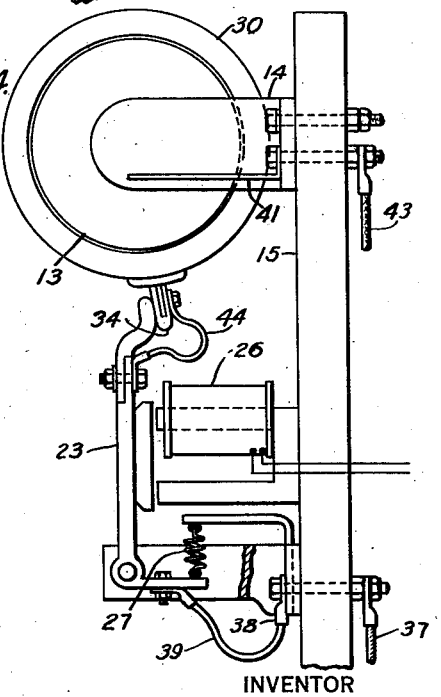
Figure 5:
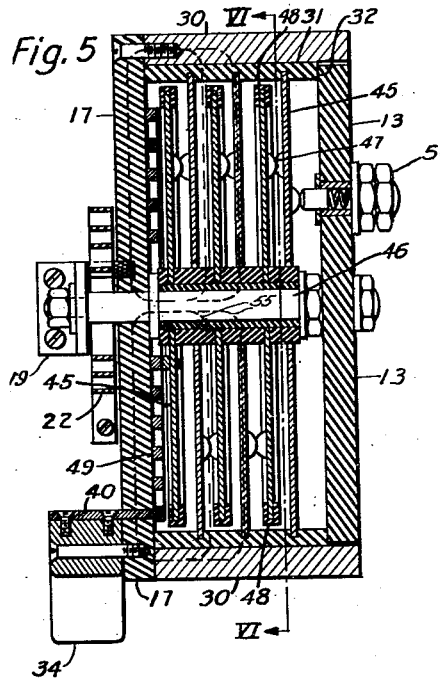
Figure 6:
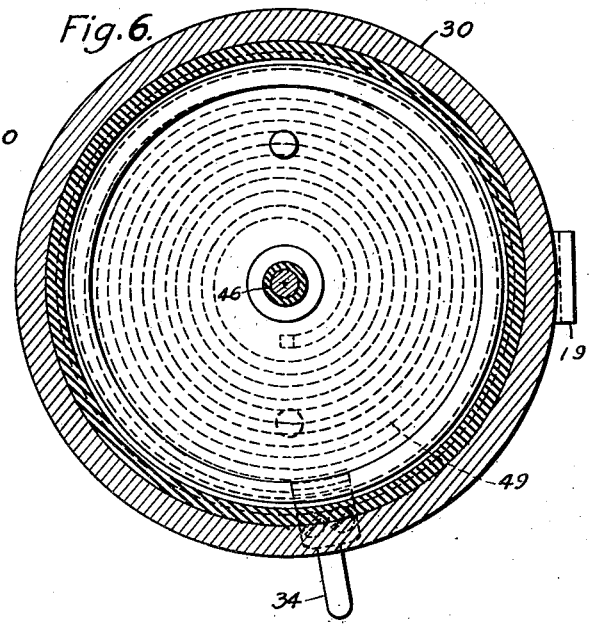
Figure 7:
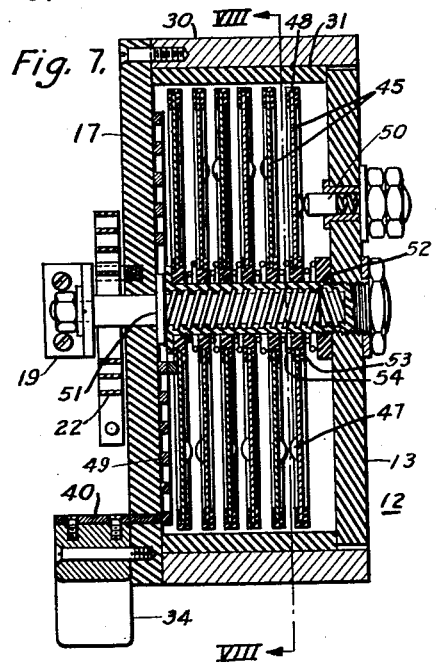

Figure 1 is a view in longitudinal vertical section of a circuit interrupter constructed in accordance with the invention, Fig. 2 is a view in section taken along the line II—II of Figure 1, Fig. 3 is a view in section similar to that of Fig. 2 showing the breaker after it has been actuated to interrupt a circuit, Fig. 4 is a view in side elevation of a breaker showing it mounted, Fig. 5 is a view in longitudinal vertical section of another embodiment of the invention, Fig. 6 is a view in section taken along the line VI—VI of Fig. 5, Fig. 7 is a view in vertical longitudinal section showing still another embodiment of the invention, and—

Figure 8:
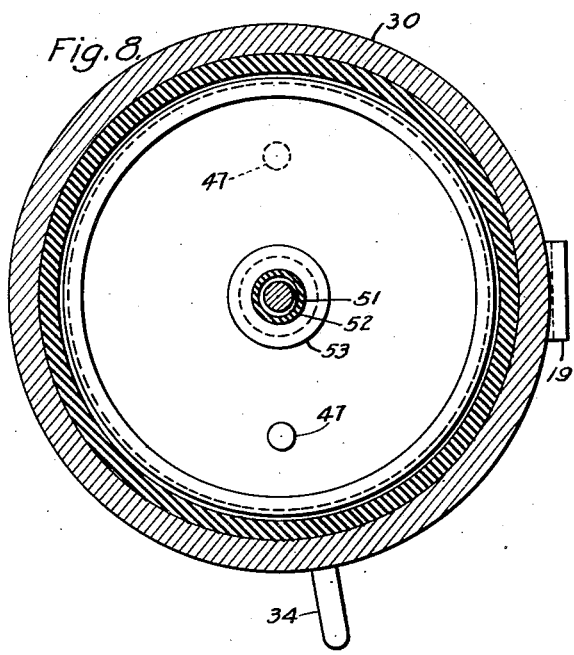

Fig. 8 is a view in section taken on the line VIII—VIII of Fig. 7.

In the embodiment of the invention illustrated in Figs. 1 to 4, inclusive, a plurality of spaced metallic cylinders made from sheet copper or some other metal possessing high electrical conductivity are provided for receiving an arc that may be drawn during the interruption of the flow of electric current in a circuit. The cylinders are arranged in this manner to provide endless substantially closed arc chutes or paths in which the arcs drawn during a switching operation may be moved at a high speed to prevent the burning of the contact members 11 or cylinders 10.

In order to facilitate the delivery of an arc drawn to the plates or cylinders without changing appreciably the length of the arcs or the voltage across them, the switching or contact members 11 are disposed between the cylinders 10 as best shown in Figs. 2 and 3. The contact members 11 employed may be of any suitable design and to some extent the design will depend on the conditions to be met.

In this embodiment of the invention, in order to provide for the operation of the contact members 11, alternate cylinders 10 are disposed for angular movement relative to the others. The extent of the angular movement of the movable cylinders may be predetermined to meet operating conditions.

In breakers of this type, it may be preferable to confine the arc and as best shown in Fig. 1, an arc box shown generally at 12 is utilized. The arc boxes illustrated in all three embodiments of the invention comprise two circular plates 13 and 17 disposed in alinement and spaced relation, and a ring 30 which is carried by the plate 17 and fitted over the plate 13. The plates 13 and 17 are made from some suitable non-inflammable insulating material such as fibre while the ring 30 is made from soft iron to adapt it for performing an additional function in the apparatus that will be explained hereinafter.

In mounting the cylinders 10 so that alternate cylinders may be moved angularly relative to the others, many different methods may be employed. In the present embodiment of the invention, the arc box 12 is utilized for operating the cylinders.

As shown, half of the cylinders are carried by each of the oppositely disposed plates 13 and 17. In mounting the cylinders in the plates 13 and 17, circular grooves 16 are provided into which the ends of the cylinders may be pressed.

The plate 13 of the arc box is carried by a bracket 14, which is bolted to the panel 15, thus the plate 13 may be classed a stationary plate and, as illustrated, carries two cylinders 10. The plate 17 is disposed for angular movement relative to the plate 13. As illustrated, the plate 17 is disposed to rotate on the stub shaft 18.

In this construction, the stub shaft is carried by a bracket 19 and extends through an opening 20 provided in the plate 17 and into a sleeve 21 carried by the plate 13. The sleeve 21 retains the plate 13 properly spaced to give the desired overlapping of the cylinders 10 carried by the opposite plate.

The cylinders 10 may be rotated relative to one another to operate the contact members 11 and cause an arc or arcs. In this particular structure, a spiral spring 22 is employed in conjunction with a switch arm, or member 23 to actuate the plate 17 and the corresponding cylinders 10. As illustrated, the inner end of the spring 22 is connected to the plate 17 by a pin 24. The other end of the spring 22 is connected to the panel 15 by a screw 25. Therefore, the spring 22 is disposed to bias the cylinders carried by the plate 17 in a direction to operate the contact members 11 to separate them.

The switching member 23 is a well-known type comprising a movable switch arm which is held in closed position by means of an electromagnet 26 and biased towards its open position by a spring 27. In the operation of the breaker, when the electromagnet 26 is deenergized, the switch arm of member 23 is actuated in a counter-clockwise direction, as viewed in Fig. 4.

When the switch arm 23 is rotated counter-clockwise as viewed in Fig. 4, the rotatably mounted cylinders 10 are given an angular movement in a clockwise direction separating the contact members 11. When the switch arm 23 is rotated clockwise the corresponding contact members 11 are moved into engagement.

In breakers of this type, when an arc is drawn on the plates 10, in order to prevent it from burning the plates or the contact members, it is moved at a high speed in the arc path or chute formed by the cylinders. The movement of the arc on the plates or cylinders is effected by a magnetic field. In this embodiment of the invention, the magnetic field is produced by an electromagnet shown generally at 28. The electromagnet comprises a coil 29 and the soft iron ring 30 which, in addition to being part of the arc box, serves as a core for the electromagnet. As illustrated, the coil 29 encircles the cylinders 10 and is disposed inside of the soft iron core 30.

The coil 29 is carried by the core 30 but they are insulated from one another by a cylindrical member 31 disposed between them. Another cylindrical insulating member 32 is disposed inside the coil 29, insulating it from the cylinders 10. The coil 29 is connected in series circuit relation with the contact members 11 and as long as current flows in it, a magnetic field is maintained which motors the arcs drawn between the spaced metallic cylinders 10 revolving them at a speed sufficiently great to prevent them from burning the cylinders 10 or contact members 11. As shown, one end of the coil 29 extends through an opening 33 in the core 30 and is electrically connected to a contact member 34 which is engaged by the switch member 23. The other end of the coil 29 is electrically connected to a cylinder 10, as shown at 35.

In order to prevent an arc drawn between the cylinders 10 from flashing over the ends of the cylinders and jumping from one stationary cylinder to another or from one movable cylinder to another, insulating rings 36 which are U-shaped in cross-section are mounted on the free ends of the cylinders. These rings may be mounted in any suitable manner. In this instance they are pressed over the ends of the cylinders making a tight fit.

Breakers of this type are primarily intended for interrupting a flow of current in low voltage circuits. In this instance, low voltages are intended to mean voltages up to 1,000 volts and in some cases even higher. By making special designs using a larger number of cylinders, this type of breaker may be utilized for interrupting circuits having much higher voltages impressed on them.

The breaker will generally be designed for the conditions to be met. For example, if the breaker is intended to interrupt a current of 30,000 amperes, copper cylinders $\frac{1}{16}$" thick spaced about $\frac{1}{16}$" apart may be utilized. The number of cylinders employed depends on the voltage. Ordinarily, a pair of cylinders or a cylinder gap is employed for each 100 volts of the total voltage across the breaker.

The spacing of the cylinders is dependent upon the resistance offered to the movement of the arc by the contained gases. The spacing of the cylinders $\frac{1}{16}$" permits the arc to move freely. The length of the cylinders need not be more than probably a couple of inches which will give overlapping ends of at least one inch. It has been found that an arc carrying 25,000 amperes has a path width of about $\frac{5}{8}$" and when such an arc is kept moving at a predetermined rate, it does not burn the cylinders.

When the switch stands in its closed position, the circuit through the breaker may be traced from the line conductor 37 through the terminal 38, conductor 39, switch member 23, contact member 34, conductor 40, coil 29, connector 35, cylinders 10 and contact members 11, conductor 41 to the terminal 42 and thence back to the line conductor 43.

Assuming that the breaker is connected into a circuit and that the electromagnet 26 is deenergized, then the spring 27 rotates the switch arm 23 counter-clockwise and the spring 22 functions to rotate the cylinders 10 carried by the plate 17 clockwise as viewed in Figs. 2 and 3. This results in a switching operation taking place between the contact members 11 carried by the cylinders, drawing an arc that may occur from the interruption of the flow of current between the cylinders. The magnetic field established by the current flowing through the coil 29 extends axially through the cylinders 10 and rotates the arc between the cylinders continuously at a speed which is great enough to prevent the burning of the cylinders.

When a circuit is interrupted, a plurality of short arcs in series are drawn between the cylinders and they are caused to travel at a high speed until the current decreases to zero when the arc is extinguished. As soon as the current decreases to zero a deionization of the arc takes place at the surface of the cylinders and a dielectric capable of preventing the restriking of the arc as the voltage builds up in the opposite direction results. In this manner, the arc is prevented from restriking and the breaker has performed its function.

A shunt 44 is connected between the switch arm 23 and the contact member 34. This shunt 44 is employed because this method has been utilized for operating the breaker. Any means for controlling the movement of the spring biased cylinders 10 could be substituted for the switch arm 23 with equal success. The movably mounted cylinders are disposed to turn through an angle of about 15° in actuating the contact members 11.

The modified forms of the breaker illustrated in Figs. 5 to 8, inclusive, are somewhat different in structure from the preferred form illustrated in Figs. 1 to 4, inclusive. As illustrated, the modified breakers employ plates 45 for carrying the arc instead of cylinders 10 utilized in the preferred form. The use of plates in the modified breakers requires a change in the structure of the magnet coil 29 in order to produce a radial magnetic field which will rotate the arc in a circular path on the plates.

In order to perform switching operations between the plates, provision is made for moving them relative to one another. In the modification illustrated in Figs. 5 and 6, alternate plates are mounted on the insulating ring 32 while the remainder of the plates are disposed on a shaft 46. As shown, the plates 45 carried by the shaft 46 are insulated therefrom. Contact members 47 are provided on opposite sides of the plates 45 and may be moved relative to one another by the rotation of the shaft 46 and the plates carried by it.

Rings 48 of some suitable insulating material are provided to prevent arcs drawn between the contact members 47 from running over the edges of the movable plates 45 and jumping from one fixed plate to another. These rings of insulating material may be mounted in any suitable manner, and in this instance they are made of substantially U-shape and are pressed over the edges of the plates 45.

The magnet coil for producing a radial magnetic field for rotating the arc on the plates 45 is made in the form of a flat spiral as shown at 49 and is disposed on the plate 17. When the magnet coil 49 is made in this shape, it is preferable to make the plate 17, the shaft 46 and the ring 30 of some suitable magnetic material and the plate 13 of non-magnetic material. When the breaker illustrated in Figs. 5 and 6 is closed, a circuit may be traced through it from the conductor 40, through the flat coil 49, the end contact plate 45 and then through the contact members 47 and the movable and stationary plates 45 to the terminal 50. When the plates carried by the shaft 46 are actuated to a predetermined angle by the spring 22 upon the operation of the switch arm 23 to its open position, arcs may be drawn between the contact members 47. When arcs are drawn between the contact members, a magnetic field indicated by the dotted lines 55 is established by the current flowing in the coil 49 and the arcs drawn are rotated around the breaker between the plates 45 until the current flowing decreases to zero. As soon as the current reaches zero, a deionization process takes place at the surface of the plates and a strong dielectric layer is built up, which prevents the restriking of the arcs in the manner described hereinbefore.

The modified breaker illustrated in Figs. 7 and 8 is very similar to the structure illustrated in Figs. 5 and 6, the only difference being in the manner in which the plates are arranged for movement to effect the operation of the contact members 47. As shown, in this structure, the plates 45 are disposed to be separated from one another by moving them along axial lines.

In this embodiment of the invention, the plate 13 is disposed for movement relative to the remainder of the casing or arc box 12. In order to actuate the plate 13, a threaded shaft 51 is provided and disposed to be actuated by the spring 22. A sleeve 52 of some suitable insulating material is provided with an internal thread to receive the threaded shaft 51. The plates 45 are disposed to slide freely on the sleeve 52. As shown, rings of insulating material 53 are interposed between the plates 45 and the sleeve 52. Coil springs 54 are mounted between the rings 53.

When this modified type of breaker is closed, a circuit may be traced which extends from the conductor 40 through coil 49 the lowermost plate 45 and then through the contact members 47 and the plates 45 to the terminal 50. In order to interrupt the circuit, the switch arm 23 is released permitting the spring to rotate the shaft 51. As the shaft rotates the plate 13 is moved axially thereof, relieving the pressure on the springs 54 with the result that they separate the plates 45 and the contact members 47. When the plates are actuated in this manner, arcs may be drawn between the contact members 47.

When the arcs are drawn, they are rotated around the plates 45 in a circular path. The arcs are extinguished in the same manner as described hereinbefore, that is, when the current is decreased to zero, a strong dielectric layer is built up on the surfaces of the plates which prevents the restriking of the arc.

On closing the breaker, the switch arm 23 is actuated to its closed position rotating the shaft 51 and drawing the plate 13 inwardly compressing the springs 54. In this manner, the contact members 47 are again brought into engagement establishing a circuit through the breaker.

In all thre modifications, the plate 13 is spaced a short distance from the insulating ring 31 and from the casing 30 to provide an opening through which gases formed in the breaker during circuit interrupting operation may escape.

Since certain changes may be made in the above construction and different embodiments of the invention could be made without departing from the scope thereof, it is intended that all matter contained in the above description or shown in the accompanying drawings shall be interpreted as illustrative and not in a limiting sense.

I claim as my invention:

1. A circuit breaker comprising, in combination, a plurality of concentrically disposed metallic cylinders, predetermined cylinders being disposed for rotary movement relative to the other cylinders, switch members disposed between the cylinders to be actuated as the rotatably mounted cylinders are moved angularly, the cylinders presenting an endless path for an arc drawn between the switch members and means for causing the arc to move in the endless arc path until extinguished.

2. In a circuit breaker, in combination, a plurality of concentrically mounted metallic cylinders, predetermined cylinders being disposed for rotation relative to the other cylinders, switch members disposed between the metallic cylinders whereby arcs drawn are delivered to the cylinders and means for moving an arc drawn between the cylinders until it is extinguished and prevented from restriking as a result of the recombining of ions at the surface of the cylinders.

3. In a circuit breaker having means for extinguishing arcs drawn during the interruption of flow of alternating current in a circuit, in combination, switch members for performing switching operations to interrupt the flow of current, a plurality of spaced cylinders, some of said cylinders being rotatable to move said switch members and said cylinders substantially enclosing the switch members and presenting an endless path for an arc drawn during the interruption of the flow of current, and means cooperative to cause the arc to travel in the endless path as long as current flows in the circuit, the spaced cylinders cooperating to build up a dielectric to prevent the restriking of the arc after it has been extinguished when the current reaches zero.

4. In a circuit breaker having means for extinguishing arcs drawn during the interruption of flow of alternating current in the circuit, in combination, switch members for performing switching operations to interrupt the flow of current in the circuit and a plurality of spaced plates presenting an endless path for the arc drawn during the switching operations, some of said plates being rotatable to actuate said switch members and the switch members being disposed between the plates, the plates cooperating in the building up of a dielectric to prevent the restriking of the arc after it has been extinguished by the current passing through zero.

5. In a circuit breaker having means for extinguishing arcs drawn during the interruption of a circuit, in combination, a plurality of pairs of contact members connected in series circuit relation and disposed for operation to interrupt a circuit and divide an arc drawn into sections, conducting members providing a plurality of arc paths one for each pair of contact members, alternate conducting members being rotatable to separate said contact members and the arc paths provided by said conducting members being disposed to receive the arc sections whereby from the drawing of the arc until it is extinguished the total number of anodes and cathodes is not changed.

6. In a circuit interrupter, a plurality of superposed, spaced conducting members providing annular arc paths, means for pivotally mounting some of said members for rotation relative to the other of said members, means for causing short arcs between said conducting members upon the rotation of the pivotally mounted conducting members, and means for rotating said short arcs about the annular paths provided by said conducting members.

7. In an arc extinguisher, a plurality of concentric cylindrical sheet metal members, means for rotating alternate ones of said cylindrical sheet metal members, for causing a plurality of serially related short arcs between said members, and means for rotating each of said short arcs until it is extinguished.

8. In a circuit interrupter, a plurality of cylindrical conducting members positioned one within the other, means for rotating some of said cylindrical conducting members about their axes and thereby initially interrupting the conducting path through the circuit interrupter within said cylindrical conducting members and causing a plurality of short arcs in series with each other between said cylinders, and means for continuously rotating the terminals of each of said short arcs on said cylinders.

9. In a circuit interrupter, a plurality of pairs of conducting members mounted with spaces of fixed width therebetween, means for initially interrupting the conducting path through the circuit interrupter in the spaces between said pairs of conducting members by causing a plurality of serially connected arcs one of which is initially drawn in the space between each of said pairs of conducting members, and means for rotating said arcs between said conducting members.

10. In a circuit interrupter, a plurality of tubular means formed at least partially of conducting material and positioned one within the other for defining a plurality of arc chambers, each of which has the substantial form of a hollow prism, means movable during each opening operation of said interrupter to simultaneously establish a plurality of serially connected arcs, one within each of said arc chambers, and means for transversely moving each of said arcs within the chamber wherein it is established to effect its extinguishment.

11. In a circuit interrupter, a plurality of metallic tubes positioned one within the other for defining a plurality of arc chambers, each of which has the substantial form of a hollow prism, predetermined tubes being arranged for movement relative to the other tubes, means for moving said predetermined tubes during each operation of said interrupter, means actuable in response to said movement of said predetermined tubes to establish simultaneously a plurality of serially connected arcs, one of said arcs being established within each of said chambers and having its terminals on the opposed surfaces of the tubes defining that chamber, and means for transversely moving each of said arcs within the chamber wherein it is drawn to effect its extinguishment.

12. In a circuit interrupter, a plurality of concentrically arranged tubular means formed at least partially of conducting material, said tubular means being positioned one within the other for defining a plurality of concentric arc chambers having the substantial form of hollow prisms, means operable during each opening operation of said interrupter to establish, simultaneously, a plurality of serially connected arcs, one within each of said arc chambers, means for transversely moving each of said arcs in recurrent paths within the arc chamber wherein it is established to effect its extinguishment, and means of insulating material for defining the path or paths in which each of said arcs may be moved by said arc moving means.

13. In a circuit interrupter, a plurality of concentrically arranged, metallic tubes positioned one within the other for defining a plurality of arc chambers having the substantial form of hollow prisms, alternate tubes being arranged for movement relative to the other tubes, cooperating contacts supported upon adjacent tubes, means for connecting each pair of cooperating contacts in series with one another, means for moving said alternate tubes during each operation of said interrupter to effect the separation of each pair of cooperating contacts and the simultaneous establishment of a plurality of serially connected arcs, one within each of said arc chambers, and means for transversely moving each of said arcs within the arc chamber wherein it is established.

14. In a circuit interrupter, a plurality of cylindrical, metallic tubes positioned one within the other, concentrically, for defining a plurality of concentric arc chambers having the substantial form of hollow cylinders, predetermined tubes being arranged for rotative movement relative to the other tubes, about the common axis of said arc chambers, means for rotating said predetermined tubes simultaneously during each operation of said interrupter, means actuable in response to said rotation of said predetermined tubes to establish, simultaneously, a plurality of serially connected arcs, one of which is established within each of said arc chambers and has its terminals on the opposed surfaces of the tubes defining that chamber, and means for creating a magnetic field within each of said arc chambers at least during each circuit opening operation for moving each of said arcs transversely within that chamber wherein it is established.

15. In a circuit interrupter, a plurality of cylindrical, metallic tubes positioned one within the other, concentrically, for defining a plurality of concentric arc chambers having the substantial form of hollow cylinders, alternate tubes being arranged for rotative movement relative to the other tubes about the common axis of said arc chambers, means for rotating said alternate tubes simultaneously during each operation of said interrupter, cooperating contact means mounted on adjacent tubes and actuable in response to said rotation of said alternate tubes to establish simultaneously, a plurality of serially connected arcs, one of which is established within each of said arc chambers and has its terminals on the opposed surfaces of the tubes defining that chamber, means for moving each of said arcs transversely within the arc chamber wherein it is established in recurrent paths to effect its extinguishment, and means of insulating material for defining the paths in which each of said arcs may be moved by said arc moving means.

16. In a circuit interrupter, a plurality of fixedly supported, generally parallel plate members, superposed one upon the other at spaced intervals for defining a plurality of separate arc chambers, contact means positioned within each of said arc chambers, cooperating contact means supported for movement within each of said arc chambers during the operation of said interrupter, and actuating means for moving said last mentioned contact means into and out of engagement with said first mentioned contact means to open and to close the electrical circuit through said interrupter and to establish, simultaneously, during each opening operation of said interrupter a plurality of serially connected arcs, at least one of which is established within each of said arc chambers.

17. In a circuit interrupter, a plurality of superposed, metallic plate members arranged in spaced, generally parallel planes for defining a plurality of separate arc chambers, contact means supported upon said plate members, cooperating contact means supported for movement within each of said arc chambers during the operation of said interrupter, actuating means for moving said last mentioned contact means into and out of engagement with said first mentioned contact means to open and to close the electrical circuit through said interrupter and to establish, simultaneously, during each opening operation of said interrupter, a plurality of serially connected arcs, at least one of which is established within each of said chambers and has one of its terminals on one of said metallic plates, and means for moving each of said arcs transversely within the arc chamber wherein it is established to effect its extinguishment, said plate members determining the path or paths in which said arcs may be moved by said arc moving means.

18. In a circuit interrupter, a plurality of flat, metallic plates, superposed one upon the other at spaced intervals for defining a plurality of arc chambers which are substantially annular in form, alternate plates being supported for rotative movement relative to the other plates, means for rotating said alternate plates simultaneously during each operation of said interrupter, cooperating contact means supported on adjacent plates and actuable in response to said rotation of said alternate plates to establish, simultaneously, a plurality of serially connected arcs, one of which is established within each of said annular arc chambers and has its terminals on the opposed surfaces of the plates defining that chamber, and means for moving each of said arcs transversely within the arc chamber wherein it is established in recurrent paths to effect its extinguishment.

19. In a circuit interrupter, a plurality of superposed, flat metallic plates, arranged in generally parallel planes which are spaced some distance from each other, for defining a plurality of arc chambers which are substantially annular in form, alternate plates being supported for rotative movement relative to the other plates, means for rotating said alternate plates simultaneously during each operation of said interrupter, cooperating contact means supported on adjacent plates and actuable in response to said rotation of said alternate plates to establish, simultaneously, a plurality of serially connected arcs, one of which is established within each of said annular arc chambers and has its terminals on the opposed surfaces of the plates defining that chamber, means for moving each of said arcs transversely within the arc chamber wherein it is established in recurrent paths to effect its extinguishment, and means of insulating material for defining the path or paths in which each of said arcs may be moved by said arc moving means.

HARRY J. LINGAL.